(12) United States Patent
Reimann

(10) Patent No.: US 11,456,607 B2
(45) Date of Patent: Sep. 27, 2022

(54) HEXAGONAL BATTERY

(71) Applicant: Scott Reimann, Greenwood Village, CO (US)

(72) Inventor: Scott Reimann, Greenwood Village, CO (US)

( * ) Notice: Subject to any disclaimer, the term of this patent is extended or adjusted under 35 U.S.C. 154(b) by 67 days.

(21) Appl. No.: 16/806,534

(22) Filed: Mar. 2, 2020

(65) Prior Publication Data

US 2021/0273468 A1 Sep. 2, 2021

(51) Int. Cl.
*H02J 7/00* (2006.01)
*H01M 10/48* (2006.01)
*H01M 10/46* (2006.01)
*A24F 40/95* (2020.01)
*H01M 50/10* (2021.01)
*H02J 7/35* (2006.01)
*H02J 7/02* (2016.01)

(52) U.S. Cl.
CPC .......... *H02J 7/0045* (2013.01); *A24F 40/95* (2020.01); *H01M 10/46* (2013.01); *H01M 10/488* (2013.01); *H01M 50/10* (2021.01); *H02J 7/0047* (2013.01); *H01M 2220/30* (2013.01); *H02J 7/02* (2013.01); *H02J 7/35* (2013.01)

(58) Field of Classification Search
CPC .......... H02J 7/0045; H02J 7/0047; H02J 7/35; H02J 7/02; H01M 50/10; H01M 10/488; H01M 10/46; H01M 2220/30; A24F 40/95
USPC .................................. 320/107, 137
See application file for complete search history.

(56) References Cited

U.S. PATENT DOCUMENTS

| | | | | |
|---|---|---|---|---|
| 2009/0289603 | A1* | 11/2009 | Mahowald | H02J 7/007182 320/151 |
| 2016/0334847 | A1* | 11/2016 | Cameron | A24F 40/50 |
| 2018/0166895 | A1* | 6/2018 | Oh | H02J 7/0042 |

FOREIGN PATENT DOCUMENTS

CN 101572425 A * 11/2009

* cited by examiner

*Primary Examiner* — Zixuan Zhou
(74) *Attorney, Agent, or Firm* — Husch Blackwell LLP

(57) ABSTRACT

A rechargeable hexagonal battery for electronic devices is disclosed. The battery includes an outer casing, protecting one or more electronic components. The battery includes a plurality of sides configured with at least six sides. The battery includes at least six points of intersection between one or more of the sides. The battery includes a power button affixed to the casing. The battery includes a charging port positioned on a bottom end of the casing to provide a recharge.

8 Claims, 3 Drawing Sheets

HEXAGONAL BATTERY

CROSS REFERENCE TO RELATED APPLICATIONS

This application claims benefit under 35 U.S.C. 119 of U.S. Provisional Application No. 62/945,466, filed Dec. 9, 2019.

FIELD OF INVENTION

The present disclosure relates to the field of batteries. Specifically, this disclosure relates to a hexagonal shaped battery, preferably in Electronic cigarettes or vaping devices or inhalation devices.

BACKGROUND

Electronic cigarettes, vaping devices, and inhalation devices have become increasingly popular as replacement products to cigarettes and other products of inhalation. This popularity stems from the fact that these inhalation devices are considered to be safer than conventional cigarettes, due to the lower level of toxicity. The conventional cigarette provided smoking experience by burning of tobacco wrapped in a paper, and the smoke consisted of several constituents such as tar, aldehydes, polycyclic aromatic hydrocarbons (PAH's), Carbon Monoxide (CO), Benz-o-pyrene along with nicotine vapor.

Unlike conventional cigarettes, electronic devices, such as an electronic cigarette are complex since the design requires controlled heating of liquids to generate an aerosol vapor for sensorial satisfaction. There are several parts in electronic devices, especially e-cigarettes, that require a charge or the need to be provided power for a controlled but consistent operation. In order to provide a powerful, but consistent charge to various electronic devices within an electronic inhalation device, a charging device, such as a battery, is necessary for operation.

The use of a battery within these inhalation devices is essential as the use of a battery allows for the inhalation device to provide for a consistent aerosol volume that is inhaled, due to the amount of energy being supplied to the battery being consistent with a proper voltage and capacity of the battery present, at the time a user inhales. The capacity of an electronic devices battery can be chosen based on the design of electronic devices and can be anywhere from 80 mAh to 2000 mAh at standard conditions of 25° C. The energy supplied by the battery to the heater will determine the temperature of the heater.

Inhalation devices tend to be round, and like many electronic devices, further accept a round battery in order to provide the necessary charge. Often, these round batteries have the disadvantage of rolling off of various smooth surfaces, such as a table top, counter, or desk. The rolling of these round batteries lead to further disadvantages such as losing batteries, damaging the batteries, or creating hazards for others due to the batteries being unsecured.

However, none of the art described above addresses all the issues that the embodiments of the present invention do.

SUMMARY

In order to resolve many of the aforementioned problems, one skilled in the art would appreciate a solution that the hexagonal battery discloses, due to the multiple sides of the device, won't roll off of a smooth or flat surface. The use of a hexagon shaped battery allows a user to provide an advantage of more capacity of charge to an electronic inhalation device, as well as provide stronger and more capable protection for the internal battery components.

An embodiment of the present invention provides a rechargeable hexagonal battery for electronic devices is disclosed. The battery includes an outer casing, protecting one or more electronic components. The battery includes a plurality of sides configured with at least six sides. The battery includes at least six points of intersection between one or more of the sides. The battery includes a power button affixed to the casing. The battery includes a charging port positioned on a bottom end of the casing to provide a recharge.

In one embodiment, the power button is configured to be pressable resulting in a charge being provided to a cartridge of the electronic device.

In one embodiment, the power button is configured with three different power modes.

In one embodiment, the power button is configured with an illumination device resulting in three different colors illuminating in order to indicate each of the three different power modes.

In one embodiment, the charge is transmitted to the cartridge and a coil inside of the cartridge heats oil held inside of the cartridge.

In one embodiment, a top end of the casing comprises of a plurality of threads, wherein the threads are configured to be removably attached to the electronic device or a cartridge of the electronic device.

In one embodiment, each of the sides is configured to provide stability and prevent rolling as a result of being placed on a flat surface.

In one embodiment, the casing is configured to provide additional protection to one or more battery components.

In one embodiment, the hexagonal battery is configured to charge electronic devices selected from the group comprising electronic cigarettes, portable charging packs, vaping devices, inhalation devices, preferably, and electronic cigarettes.

In one embodiment, the hexagonal battery is one or more of a lithium-ion battery (including thin film lithium ion batteries), a lithium ion polymer battery, a nickel-cadmium battery, a nickel metal hydride battery, a lead-acid battery, and combinations thereof.

In one embodiment, the casing is configured to be wirelessly charged, or receive a rechargeable power via a constant DC or pulsed DC power source, a motion-powered charger, a pulse charger, a solar charger, a wind charger, a Universal Serial Bus (USB) charger, and combinations thereof.

This Summary is provided merely for purposes of summarizing some example embodiments, so as to provide a basic understanding of some aspects of the subject matter described herein.

Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The accompanying figures are included to provide a further understanding of the invention, and are incorporated in and constitute a part of this specification. The figures illustrate embodiments of the invention and, together with the description, serve to explain the principles of the invention.

The foregoing and other objects, aspects, features, and advantages of the disclosure will become more apparent and better understood by referring to the following description taken in conjunction with the accompanying drawings, in which.

DETAILED DESCRIPTION

Figure 1:
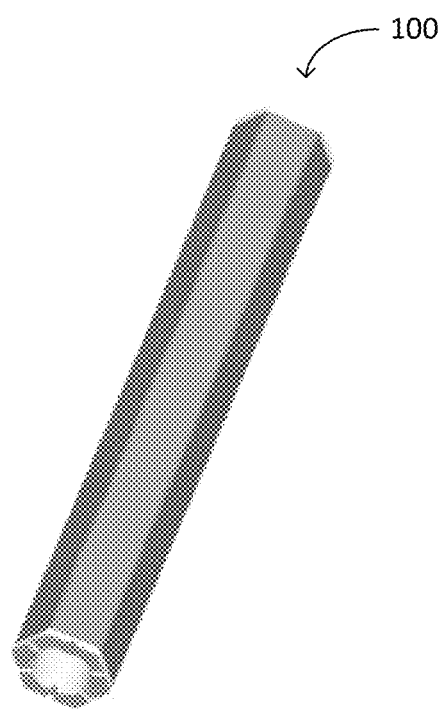
FIG. 1 illustrates a perspective view of hexagonal battery, in accordance with an example.

Some detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

The detailed description set forth below in connection with the appended drawings is intended as a description of the presently contemplated embodiments of the hexagonal battery or power source, and is not intended to represent the only form in which the disclosed invention may be developed or utilized. The description sets forth the various functions and features in connection with the illustrated embodiments.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It is to be understood, however, that the same or equivalent functions may be accomplished by different embodiments that are also intended to be encompassed within the scope of the present disclosure. It is further understood that the use of relational terms such as first and second, top and bottom and the like are used solely to distinguish one from another entity without necessarily requiring or implying any actual such relationship or order between such entities. All the terminologies and techniques mentioned herein are not particular to any specific embodiment, and it does not scale down different personifications of our invention. Use of words like "and/or" herein includes all the associated listed items and holds all the combinations of different embodiments. Use of singular form of words like "a/an/the" also associate their plural forms into the context unless otherwise clearly defined for their singular meaning.

All the scientific and technical terms used in this document should be subjected to general understandings of the one with ordinary skills in the field of the invention unless otherwise defined prior. A further understanding is also required to interpret all the terms from the commonly used dictionary reference to the consistency in the contextual background rather than their literal meanings that can create confusion between their idealized and subjective meanings.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 2:
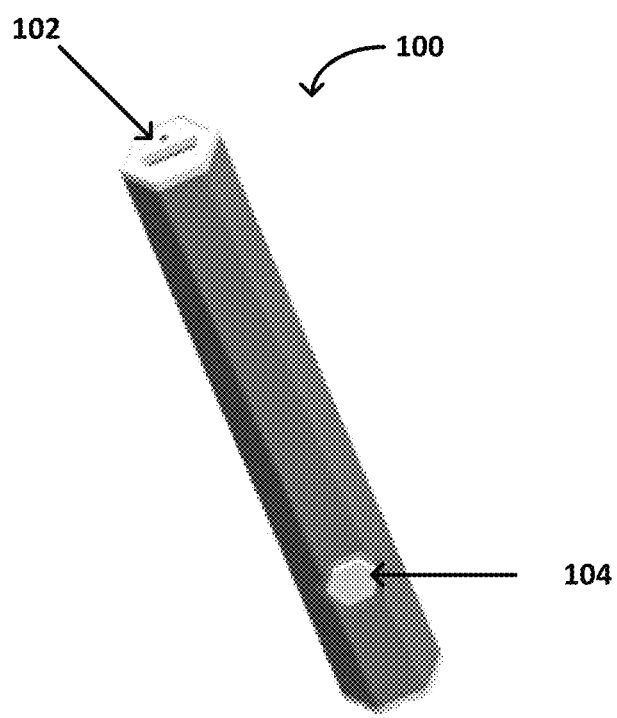
FIG. 2 illustrates a front perspective view of the hexagonal battery, in accordance with an example.
Figure 3:
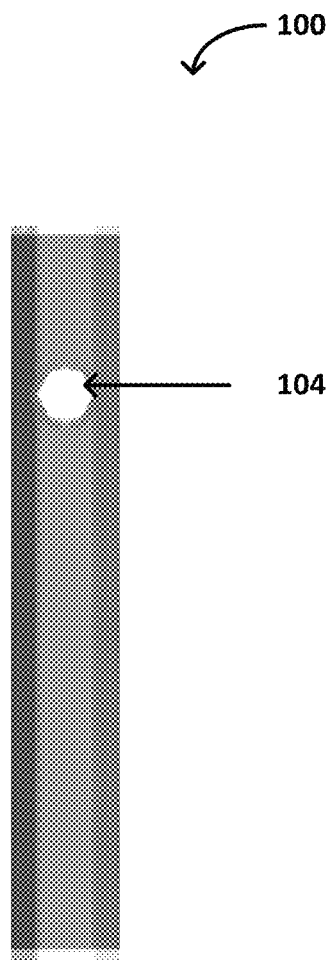
FIG. 3 illustrates a side view perspective view of the hexagonal battery, in accordance with an example.

Referring to FIG. 1 and FIG. 2, the figures illustrate a battery 100 configured to provides charge to an electronic device, or an electronic inhalation device, in one embodiment of the present invention. Accordingly, a rechargeable hexagonal battery 100 for electronic devices is disclosed. The battery 100 includes an outer casing, protecting one or more electronic components. The battery 100 includes a plurality of sides configured with at least six sides. The battery 100 includes at least six points of intersection between one or more of the sides. The battery 100 includes a power button 104 affixed to the casing. The battery 100 includes a charging port positioned on a bottom end of the casing to provide a recharge.

Upon the power button 104 being pressed, the battery 100 is configured to activate, and become power source, allowing the cartridge within an e-vaping device to be heated via a heating element, in order to ensure proper vaping operation.

The battery 100 having six sides, and in some cases can be constructed to have more than six sides, is configured with additional capacity, and a protective structure that is operable to protect the electronic components within the battery 100. The additional capacity afforded by the hexagonal shape of the battery 100 allows a user to possess a battery 100 that holds additional charge, resulting in longer use, and a more consistent draft of the oils within a cartridge that is removably attached to a inhalation device. The additional capacity allows the electronic components within the inhalation device to be provided with a more consistent charge in order to ensure the constant flow of charge to each component for a long lasting vaping experience.

In one embodiment, the battery 100 may contain an electronic airflow sensor whereby activation is triggered simply by drawing breath through the device. The airflow sensor senses a draw or pulls being taken by a user, and once the sensor is activated, the battery 100 is then powered. Upon the battery 100 being powered, simultaneously a heating element or other electronic components within an electronic device or e-vaping device, will be powered, and allow for a consistent power flow for constant powered usage. Once the draw, pull, or breathing stops from the user, the airflow sensor can immediately deactivate the power source from the battery 100, or set a timer, to shut down the device after a predetermined time limit.

The shape of the battery 100 prevents the battery 100 from rolling off of a flat smooth surface. Due to each side being constructed with a flat surface in between two corners or points of the battery 100, the battery 100 is provided the ability to remain in place and not roll off of a table. Each of the corners serves as a deterrent from rolling, and braces the battery 100 in place, thus preventing the loss of the battery 100 or unwarranted damage. Each of the sides of the battery 100 can be equal in width, or vary in width, in order to ensure proper stability on a flat surface, to prevent rolling.

The battery 100 can be configured to power cartridges that are removably attached to an inhalation device. Each of the cartridge are filled with a nape juice. Liquid flavored nicotine products, cannabidiol (CBD), and tetrahydrocannabinol (THC) oil. The battery 100 can be configured to bring power to single power cartridge or element with an inhalation device, or bring power to multiple electric elements with an inhalation device. In some instances, the battery 100 can be configured to send pulses of charge to a device at a predetermined time, to power one or more elements or any combination thereof at a time.

In some embodiments, the battery 100 can comprise of a microprocessor, configured to communicate with an inhalation device in order to send charge to a heating element, an LED light, a USB port, or other electronic element that may need to be powered. Each of the elements can be powered on demand, or at various predetermined time intervals, in order to provide a consistent power flow.

The battery 100 can be configured with a power button 104 on an outer casing of the battery 100. The outer casing of the battery 100 holds the structure of the hexagon shape, and provides additional protection to the battery 100 and its electronic charging components inside, that makeup the battery 100. The power button 104 can be configured to be in the shape of a hexagon, and configured with a light, an illumination device, or a light emitting diode (LED). The button 104 is configured to be pressed and held to provide power to the cartridge. Upon the pressing of the button 104, three different power modes can be activated. The power modes can comprise of low power, medium power, high power, timed power, or a single puff power-up setting. Each of the settings if pre-programmed into the battery 100 and are configured with a corresponding light color. The illumination source or LED will light up with the corresponding color, each time a specific mode is selected. In some embodiments, the activation of one or more power modes can be configured to be based off a predetermined time interval of pressure being applied to the button 104. For example, the lower power mode can be activated after 1 second of pressure, the medium power activated after 3 seconds of pressure, and the high power mode activated after 5 seconds of pressure.

The battery 100 is configured to be used as a power source in a preferred embodiment of providing power to a vapor generation device or e-vaping device. The e-vaping device can draw power through an input and output port, or through the positive and negative ends of the hexagonal battery 100. In some examples, the battery 100 can be communicatively coupled to additional hexagonal batteries in order to increase the charge of an e-vaping device. Additionally a second power source can be connected to the hexagonal battery 100 in order to extend the charge or to increase the amount of power added to the e-vaping device in order to create a more powerful pull from the e-vaping device. For example, an external power supply can supply power to the vapor device and a battery 100 can store at least a portion of the supplied power. The one or more batteries can be deployed with a phone and/or an accessory device. In an aspect, the one or more batteries can be utilized to power at least one of the phone and/or the accessory device. An adapter is configured to provide an additional charge to a user equipment or mobile device, wherein the adapter is communicatively coupled to one or more terminals of the hexagonal battery. In some examples, an adapter can be built into the battery, or an additional charging port can be built in order to charge additional devices such as a mobile device, tablet, or user equipment (UE).

The casing and/or the battery 100 can be configured to be at least 3.5 inches long, and 0.5 inches wide. The measurements can vary depending on the amount of charge needed, and the size of the battery 100 cavity compartment in one or more electronic devices. The battery 100 can also be painted a predetermined color that is representative of the type of charge of the battery 100, or to meet manufacturing requirements. The battery 100 further comprises of a light weight, which allows a user to maintain a light weight device that is being power by the battery 100, in the event of the electronic device's need to be portable. The casing or battery 100 also has a plurality of threads at the top end. The threads are configured to removably attach the battery 100 to the inside of an electronic device, or attached a cartridge to the battery 100 itself. The bottom end of the battery 100 comprises of a charging port, allowing for the battery 100 to be recharged.

In accordance with one example, of the above described components, the battery 100 is used to power cartridges filled with nape juice, liquid flavored nicotine products, CBD and THC oil. The battery 100, configured with threads on the top end, allows the battery 100 to screw onto a cartridge that is filled with the product. The button 104 located on the battery 100 is pressed and held to provide power to the cartridge. When the battery 100 applies power to the cartridge, it allows the coil inside the cartridge to heat, and vaporize the oil within the cartridge. Accordingly, the heating allows a user to inhale, or puff the product through the inhalation device, resulting in a vapor being dispensed from the oil, through the mouth piece of the device. The bottom end of the battery 100 comprises of a charging port, allowing the battery 100 to be recharged a predetermined amount of times.

The hexagonal battery 100 can be configured to be rechargeable via alternating current (AC) or direct current (DC). The battery 100 can be constructed from or made of one or more of a lithium-ion battery 100 (including thin film lithium ion batteries), a lithium ion polymer battery 100, a nickel-cadmium battery 100, a nickel metal hydride battery 100, a lead-acid battery 100, and combinations thereof. The one or more batteries can be configured for one or more of, wireless charging supplying a constant DC or pulsed DC power source to a battery 100 being charged, a motion-powered charger, a pulse charger, a solar charger, a wind charger, a Universal Serial Bus (USB) 102 charger, and combinations thereof.

In other aspects of the disclosure, the hexagonal battery 100 can be configured to power an electronic user device such as a smartphone, a smart watch, a computer, a smartphone, a laptop, a tablet, a set top box, a display device, or other device capable of communicating with the computing device.

The novel re-chargeable battery 100 of the present invention may be used in devices meant for vaporizing a liquid for sensorial enjoyment or for vaporizing liquid meant to be used as medicament for therapeutic purposes or for vaporizing liquid meant for providing fragrance, i.e., perfumes.

The battery 100 of the present device may be used for electronic devices, selected from the group comprising electronic cigarettes, portable charging packs, vaping devices, inhalation devices, preferably electronic cigarettes.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

One skilled in the art would appreciate that the execution of a hexagonal battery 100, as provided by any combination of the examples or embodiments described by Applicant.

Although the present invention has been described in terms of various embodiments, it is not intended that the invention be limited to these embodiments. Modification within the spirit of the invention will be apparent to those skilled in the art.

What is claimed is:

1. A rechargeable hexagonal battery for electronic devices comprising:
   an outer casing, protecting one or more electronic components;
   a plurality of sides configured with at least six sides;
   at least six points of intersection between one or more of the sides;
   a power button affixed to the casing; and
   a charging port positioned on a bottom end of the casing to provide a recharge,
   wherein the power button is configured to be pres sable resulting in a charge being provided to a cartridge of the electronic device, the power button is further configured with three different power modes, and
   wherein the power button is configured with an illumination device resulting in three different colors illuminating in order to indicate each of the three different power modes.

2. The hexagonal battery of claim 1, wherein the power modes can be one or more of low power, medium power, high power, timed power, or a single puff power up setting.

3. The hexagonal battery of claim 1, wherein the power button is configured to activate one or more power modes based on a predetermined time count of pressure applied to the power button.

4. The hexagonal battery of claim 1, wherein each of the sides is configured to provide stability and prevent rolling as a result of being placed on a flat surface.

5. The hexagonal battery of claim 1, wherein the casing is configured to provide additional protection to one or more battery components.

6. The hexagonal battery of claim 1, configured to charge electronic devices selected from the group comprising electronic cigarettes, portable charging packs, vaping devices, inhalation devices, preferably, and electronic cigarettes.

7. The hexagonal battery of claim 1, wherein the hexagonal battery is one or more of a lithium-ion battery (including thin film lithium ion batteries), a lithium ion polymer battery, a nickel-cadmium battery, a nickel metal hydride battery, a lead-acid battery, and combinations thereof.

8. The hexagonal battery of claim 1, wherein the casing is configured to be wirelessly charged, or receive a rechargeable power via a constant DC or pulsed DC power source, a motion-powered charger, a pulse charger, a solar charger, a wind charger, a Universal Serial Bus (USB) charger, and combinations thereof.

* * * * *